US011498316B2

(12) United States Patent
Dietrich et al.

(10) Patent No.: US 11,498,316 B2
(45) Date of Patent: Nov. 15, 2022

(54) COMPOSITE FILM

(71) Applicant: Amcor Flexibles Singen GmbH, Singen (DE)

(72) Inventors: Christoph Dietrich, Singen (DE); Steven Welvaert, Ghent (BE); Bert De Schoenmaker, Oostakker (BE)

(73) Assignee: AMCOR FLEXIBLES SINGEN GMBH, Singen (DE)

( * ) Notice: Subject to any disclaimer, the term of this patent is extended or adjusted under 35 U.S.C. 154(b) by 0 days.

(21) Appl. No.: 16/758,698

(22) PCT Filed: Sep. 19, 2018

(86) PCT No.: PCT/EP2018/075391
§ 371 (c)(1),
(2) Date: Apr. 23, 2020

(87) PCT Pub. No.: WO2019/081133
PCT Pub. Date: May 2, 2019

(65) Prior Publication Data
US 2020/0338871 A1 Oct. 29, 2020

(30) Foreign Application Priority Data

Oct. 26, 2017 (EP) .................................... 17020508

(51) Int. Cl.
*B32B 27/08* (2006.01)
*B32B 7/02* (2019.01)
(Continued)

(52) U.S. Cl.
CPC ................ *B32B 27/08* (2013.01); *B32B 7/02* (2013.01); *B32B 7/06* (2013.01); *B32B 7/12* (2013.01);
(Continued)

(58) Field of Classification Search
CPC .. B32B 27/08; B32B 7/02; B32B 7/06; B32B 7/12; B32B 15/085; B32B 15/20;
(Continued)

(56) References Cited

U.S. PATENT DOCUMENTS 9,790,010 B2 * 10/2017 Dietrich ................. B32B 15/20
2006/0141241 A1 * 6/2006 Carespodi ........... C08L 23/0815
428/327

FOREIGN PATENT DOCUMENTS

CN         1968814 A      5/2007
CN       101058358 A     10/2007
(Continued)

OTHER PUBLICATIONS

Oxygen Barrier Properties of Polypropylene/Polyamide 6 Blends, R. M. Holsti-Miettinen et al., Jun. 6, 1995 (Year: 1995).*
(Continued)

*Primary Examiner* — Ellen S Hock

(57) ABSTRACT

Composite film (1) for closing a container (10) by sealing the composite film (1) against a circumferential sealing surface (11) of the container (10) or of a cap ring (12) to be connected to the container (10). The composite film (1) comprises an outer support layer (30) made of a metal film and an inner multilayer membrane (20) laminated to the outer support layer (30) using a bonding layer (28). The membrane (20) has a consecutive layer structure from the outside to the inside consisting of a backbone layer (21) made of polypropylene, an intermediate layer (23) made of a partially crystalline polyamide and a cohesively breakable peeling layer (25) made of polypropylene, polyethylene and talc, wherein between the intermediate layer (23) and the backbone layer (21) as well as between the intermediate layer (23) and the peeling layer (25) there is arranged a tie layer (22, 24) made of a maleic acid anhydride grafted polypropylene. The membrane has further an innermost
(Continued)

sealing layer (26) made of a random copolymer comprising monomers of propylene, ethylene and butylene, wherein the random copolymer is grafted with maleic acid anhydride. The softening point of the sealing layer (26) lies at least between 15 and 25° C. lower than that of the tie layers (22, 24). A use and a method of producing said composite film (1) are also disclosed.

16 Claims, 1 Drawing Sheet

(51) Int. Cl.
    *B32B 7/06*       (2019.01)
    *B32B 7/12*       (2006.01)
    *B32B 15/085*     (2006.01)
    *B32B 15/20*      (2006.01)
    *B32B 27/20*      (2006.01)
    *B32B 27/32*      (2006.01)
    *B32B 27/34*      (2006.01)
    *B65B 53/02*      (2006.01)
    *B65D 77/20*      (2006.01)
(52) U.S. Cl.
    CPC ............ *B32B 15/085* (2013.01); *B32B 15/20* (2013.01); *B32B 27/20* (2013.01); *B32B 27/32* (2013.01); *B32B 27/34* (2013.01); *B65B 53/02* (2013.01); *B65D 77/2024* (2013.01); *B32B 2250/05* (2013.01); *B32B 2264/102* (2013.01); *B32B 2307/31* (2013.01); *B32B 2439/40* (2013.01)

(58) Field of Classification Search
    CPC ......... B32B 27/20; B32B 27/32; B32B 27/34; B32B 2250/05; B32B 2264/102; B65B 53/02; B65D 77/2024
    See application file for complete search history.

(56) References Cited

FOREIGN PATENT DOCUMENTS

| | | |
|---|---|---|
| CN | 102514328 A | 6/2012 |
| EP | 2492089 A1 | 3/2002 |
| WO | 2011054470 A1 | 5/2011 |

OTHER PUBLICATIONS

Polyamide-based blends, Daniela Rusu et al., Jan. 2003 (Year: 2003).*

* cited by examiner

COMPOSITE FILM

The present invention relates to a composite film for closing a container by sealing the composite film against a circumferential sealing surface of the container or of a cap ring to be connected to the container wherein the composite film comprises an outer support layer made of a metal film and an inner multilayer membrane laminated to the outer support layer using a bonding layer. The invention further relates to a use of the composite film and to a method of producing it.

Composite films comprising a sealing layer for closing a container by sealing the composite film against a circumferential sealing surface of the container or of a cap ring to be connected to the container are known for example from EP 2 678 154 B1 that discloses a composite film with a support layer made of a metal film and a sealing layer connected to the metal film, wherein the sealing layer comprises a coextruded layer with a cohesively breaking intermediate layer and adhesion promoter layers arranged on both sides of the intermediate layer, and wherein the adhesion promoter layers are made of a polypropylene modified with maleic acid anhydride and a thermoplastic plastic containing more than 50 wt.-% polypropylene (PP) is used as the intermediate layer.

Sealing a lid onto a circumferential sealing surface of a container requires heat and pressure. If the lid consists of a multilayer film there is some risk that during the sealing procedure some of the lid film layers other than the sealing layer are crushed due to the sealing conditions, i.e. some layers other than the sealing layer may be softened by overheating and under the sealing pressure may then be crushed. Said crush of one or more layers of a composite film used for a container closure may be overheated and hence decrease the tightness and the corrosion resistance of said container closure.

The object of present invention is to provide an improved closure of cup-shaped containers having a reduced risk to be crushed under sealing conditions and having an increased corrosion resistance providing a long shelf-life of the packaged product.

The object of present invention is accomplished by a composite film comprising an outer support layer made of a metal film and an inner multilayer membrane laminated to the outer support layer, wherein the membrane has a consecutive layer structure from the outside to the inside consisting of a backbone layer made of polypropylene, an intermediate layer made of a partially crystalline polyamide and a cohesively breakable peeling layer made of polypropylene, polyethylene and talc, wherein between the intermediate layer and the backbone layer as well as between the intermediate layer and the peeling layer there is arranged a tie layer made of a maleic acid anhydride grafted polypropylene (MAH-PP), the membrane further has an innermost sealing layer made of a random copolymer comprising monomers of propylene, ethylene and butylene, the random copolymer being grafted with maleic acid anhydride (MAH), wherein the softening point of the sealing layer lies at least between 15 and 25° C. lower than that of the tie layers.

Preferred embodiments of the composite film are described in the claims dependent on claim 1. Further features and details of the invention will become apparent from the description and the drawings.

The composite film of present invention is a sealable and peelable composite film. The innermost sealing layer of the composite film is the layer contacting the circumferential sealing surface of the container or of the cap ring when closing the container.

The random copolymer is preferably a statistical copolymer mainly consisting of propylene and having a content of ethylene and butylene monomers. The ethylene and butylene contents together is preferably less than 10% wt. of the copolymer. This random copolymer is grafted with maleic acid anhydride and has a preferred melting or softening point of about 140 to 145° C. that is due to the composition of the copolymer.

The tie layers are preferably made of a homopolymeric polypropylene grafted with maleic acid anhydride (MAH-PP). The MAH-PP consists mainly of isotactic macromolecules wherein the MAH substituents are preferably located on the same side along the chain. The maleic acid anhydride (MAH) grafted homopolymeric polypropylene (PP) preferably has a melting or softening point of about 160 to 165° C.

The softening or melting point of the sealing layer lies at least between 15 and 25° C. lower than that of the tie layers, thus ensuring that the tie layers encapsulating the intermediate layer are not softened or melted during a sealing procedure of the composite film to a container or a cap ring being connected to a container.

The backbone layer is made of homopolymeric polypropylene having a melting or softening point of about 155 to 170° C. The backbone layer preferably has a thickness of 8 to 12 µm. The backbone layer is especially useful as support layer of the inner multilayer membrane during its manufacturing process, i.e. before laminating the inner multilayer membrane to the outer support layer. Furthermore, the backbone layer enhances the mechanical stability of the final composite film.

The intermediate layer is made of a partially crystalline polyamide (PA) having a preferred melting or softening point of between 185 and 220° C., in particular the softening point of the PA is about 190° C. Hence, the polyamide layer has a high melting point compared to the melting point of the sealing layer thus ensuring that the PA layer is not crushed under sealing conditions.

the partially crystalline polyamide of the intermediate layer is preferably a PA 6.6 (Nylon) or a PA 66.6.

The intermediate layer made of partially crystalline PA serves as an excellent barrier layer against the migration of acid or fatty components of goods packaged in the container, but the partially crystalline PA is hygroscopic. In order to prevent the absorption of water by the polyamide, the partially crystalline PA layer is covered on both sides with a homopolymeric polypropylene layer that is grafted with maleic acid anhydride. These MAH-PP tie layers function as moisture barrier layers.

The cohesively breakable peeling layer (25) is made of a composite comprising mainly polypropylene, polyethylene and talc. The cohesively breakable peeling layer contains preferably 5 to 35 wt.-% of polyethylene and the talc content lies preferably between 5 and 49 wt.-%, wherein the rest of this composite preferably consists of polypropylene.

The outer support layer is preferably an aluminium film having a thickness of 20 to 160 µm, in particular 30 to 80 µm.

The outer backbone layer and the intermediate layer preferably feature about the same thickness that amounts to about 8 to 12 µm. The peeling layer has a preferred thickness of 10 to 18 µm and each of the tie layers preferably is 3.5 to 4.5 µm thick. The sealing layer measures preferably between 2.8 and 3.2 µm in thickness.

The inventive composite film preferably is used for closing a container by means of sealing the composite film against a circumferential sealing surface of the container or of a cap ring to be connected to the container, wherein the sealing surface consists of a metal, a metal oxide, a polypropylene or of a polypropylene modified lacquer.

The sealing of the closure made of the composite film is preferably done by heating up the container or at least the cap ring to or at most 10° C. above the softening point of the sealing layer, wherein the composite film is left at ambient temperature. The closure is then pressed against the circumferential sealing surface of the heated container or cap ring.

The invention also describes a method of producing the inventive composite film comprising an outer support layer made of a metal film and an inner multilayer membrane laminated to the outer support layer using a bonding layer. The membrane features a consecutive layer structure from the outside to the inside consisting of a backbone layer made of polypropylene, an intermediate layer made of a partially crystalline polyamide and a cohesively breakable peeling layer made of polypropylene, polyethylene and talc, wherein between the intermediate layer and the backbone layer as well as between the intermediate layer and the peeling layer there is arranged a tie layer made of a maleic acid anhydride grafted polypropylene (MAH-PP), the membrane further features an innermost sealing layer made of a random copolymer comprising monomers of propylene, ethylene and butylene, the random copolymer being grafted with maleic acid anhydride (MAH), wherein the softening point of the sealing layer lies at least between 15 and 25° C. lower than that of the tie layers. The method comprises the following steps:

(a) providing a metal film as outer support layer and providing granulated components used for the multilayer membrane, especially polypropylene, maleic acid anhydride grafted polypropylene, polyamide, polyethylene, talc, maleic acid anhydride and monomers of propylene, ethylene and butylene;
(b) producing the inner multilayer membrane by coextrusion, wherein each layer composition is heated and extruded in a separate extruder;
(c) applying a bonding layer preferably made of a maleic acid anhydride grafted polypropylene onto the membrane and bringing in contact said bonding layer with said support layer;
(d) heating the composite film up to an activation temperature of between 165 to 175° C. during 1.5 to 3 s in order to permanently bond the membrane to the support layer.

When reaching the activation temperature, the last method step according to the present invention is completed. Afterwards, the composite film usually is cooled down and rolled up to form a coil.

The inner multilayer membrane of the composite film may be produced as a coextruded blown film that is cut along the extruded tube to form a flat film. Preferably, each layer composition is heated up in a separate extruder and are layered within a blow head before the multilayer membrane is pulling off from an concentric nozzle.

The inner multilayer membrane may be laminated to the outer support layer by extruding the inner multilayer film onto the support layer using an intermediate tie layer, wherein the tie layer may be a lacquer, a MAH-PP or an adhesive that is continuously provided between the support layer and the extruded hot multilayer film.

The components for the random copolymer required for the sealing layer preferably are mixed, heated up and extruded in a single extruder. In a preferred embodiment, the components for the cohesively breaking peeling layer are also premixed or pre-compounded and granulated. In a further preferred embodiment, the maleic acid anhydride component is grafted to the respective individual polymeric components as appropriate before heating and extruding said individual layer. The composition of each individual layer of the inner multilayer film corresponds to the specification indicated for the composite film.

When peeling the composite film—which may be provided with a pull tab—from the sealing surface, the peeling layer breaks cohesively and a part of the peeling layer remains behind as a "footprint" on the sealing surface. This footprint may be used as proof of first opening.

The encapsulated intermediate layer is improving the corrosion resistance of the other layers of the composite film, especially against migration of components from acidic and greasy products packaged in the container.

FIG. 1: shows schematically a structure of a composite film according to the present invention;

Figure 1:
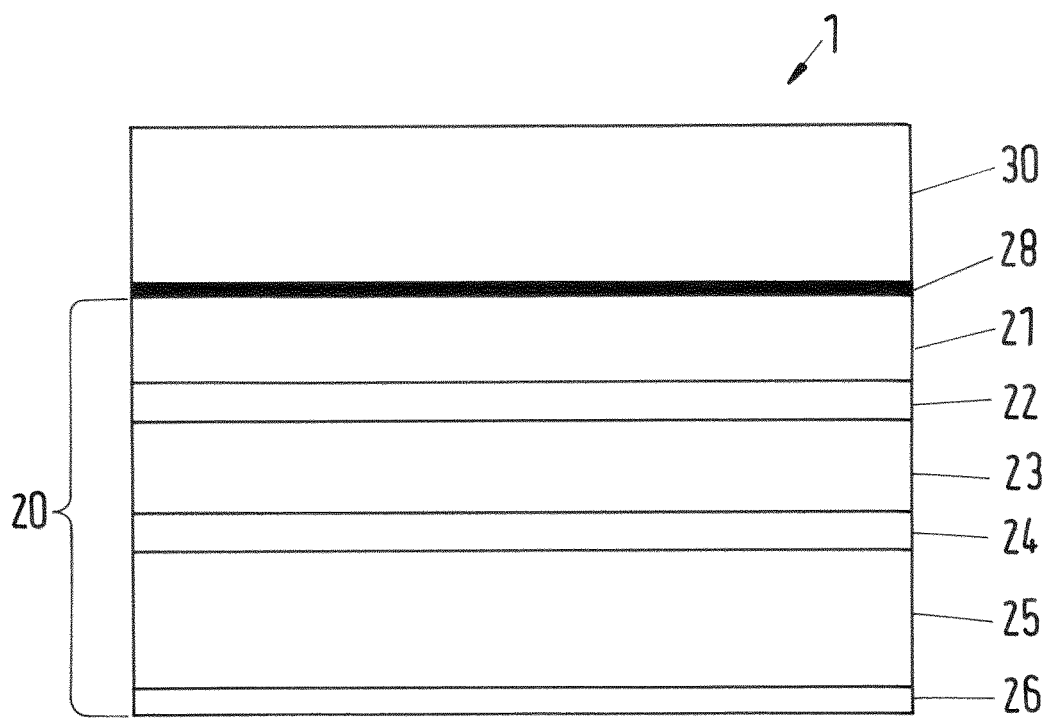

The composite film 1 shown in FIG. 1 has the following structure:
30 Outer support layer made of a metal film
28 Intermediate tie layer
21 Inner multilayer membrane, comprising the following layers:
   21 Backbone layer made of polypropylene
   22 Tie layer made of MAH-PP
   23 Intermediate layer made of partially crystalline PA
   24 Tie layer made of MAH-PP
   25 Cohesively breakable peeling layer made of PP, PE and talc
   26 Innermost sealing layer made of a random copolymer grafted with MAH The sealable and peelable composite film 1 mainly consists of a support layer 30 made of a metal film (top layer shown in FIG. 1) and a multilayer membrane 20 laminated to the metal film using a bonding layer 28. The inner multilayer membrane 20 has a structure of sequently arranged and coextruded layers 21, 22, 23, 24, 25, 26, wherein the innermost layer, i.e. sealing layer 26 (bottom layer shown in FIG. 1), is directed to a rim having a sealing surface 11 of a container 10 or to a cap ring 12 to be connected to a container 10 when the composite film 1 is used as closure of a container. The backbone layer 21 is directed to the outer support layer 30 of the composite film 1.

The inner multilayer membrane 20 may be extrusion laminated on the outer support layer 30, wherein the bonding layer is continuously provided between the outer backbone layer 21 and the extruded multilayer membrane film 20. On the other side, the multilayer membrane 20 may be laminated to the support layer 30 in a separate process step using e.g. an adhesive.

The intermediate layer 23 of the inner multilayer membrane 20 is encapsulated by the two tie layers 22, 24 on each side—the top and the bottom of said intermediate layer 23. This encapsulation protects the intermediate layer 23 made of hygroscopic polyamide against moisture from the inside of the container 10 when the composite film is used as container closure as well as from the outside. The amount of moisture coming from the inside of the container 10 depends on the container content, especially on the kind of food packed within the container 10.

The top side of the cohesively breakable peeling layer 25 is next to the bottom side of the encapsulated intermediate layer 23 joined by the tie and moisture barrier layer 24. Next to the bottom of the cohesively breakable peeling layer 25 the multilayer membrane 20 exhibits the innermost sealing layer 26.

Figure 2:
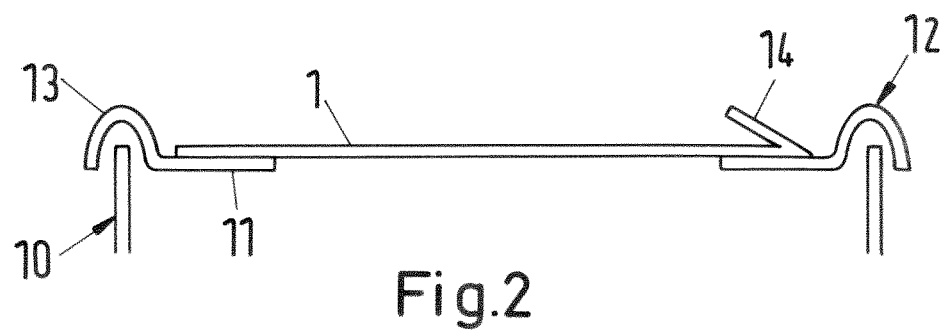
FIG. 2 shows schematically a section through a cap ring and an opening area of a container with a composite film sealed onto the cap ring.

In FIG. 2 a cap ring 12 with a beaded edge 13 for beading onto the opening edge of the container 10 is shown. The cap ring 12 has a ring-shaped, circumferential sealing surface 11, protruding horizontally inwards from the beaded edge 13. In case the sealing surface is made of a metal, it is preferably a polished surface.

The composite film 1, provided with a pull tab 14, is sealed onto the sealing surface 11. When peeling the composite film 1, the peeling layer 25 breaks cohesively and a part of the peeling layer 25 may stick on the container rim or the cap ring and serves as a "footprint" on the sealing surface 11.

Figure 3:
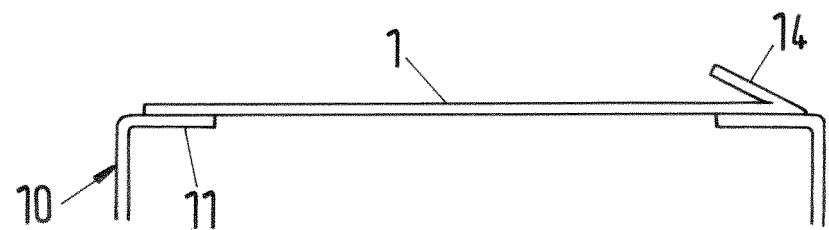
FIG. 3 shows schematically a section through the opening area of a container having an inside bent flange and a composite film sealed onto the outside of said flange.

In FIG. 3, the sealing surface 11 is an integral part of the container 10. The sealing flange providing the sealing surface 11 is formed as an inwardly bent rim of a container sleeve, i.e. the sealing flange having the sealing surface 11 is designed as a horizontally inwards running ring flange. In case the sealing surface is made of a metal, the sealing surface 11 is preferably a polished metal surface. As described above for the cap ring 12, after peeling the composite film 1 from the container 10 the peeling layer 25 or at least a part thereof may stick on the container rim and serve as a "footprint" on the sealing surface 11.

Test Results:

An inventive composite film has been used to close a container made of tinplate wherein the packaged good was acid having a pH of 2. The resulting shelf life, i.e. the storing time without showing any disturbance of the lid made of the composite film was more than one year.

An inventive composite film has been used to close a container made of tinplate wherein the packaged good was acid having a pH of 3. The resulting shelf life, i.e. the storing time without showing any disturbance of the lid made of the composite film was more than two years.

Furthermore, compared to the composite film described in EP 2 678 154 B1 the waste quote has been improved by 95%.

The invention claimed is:

1. A composite film for closing a container by sealing the composite film against a sealing surface of the container or of a cap ring to be connected to the container, the composite film comprising:
   an outer support layer comprising a metal film, an inner multilayer membrane, and an intermediate tie layer bonding the outer support layer to the inner multilayer membrane,
   wherein the inner multilayer membrane comprises an intermediate layer comprising a hygroscopic polyamide encapsulated by two tie layers each comprising a maleic anhydride grafted polypropylene, and wherein the inner multilayer membrane further comprises a backbone layer comprising polypropylene, and
   wherein the inner multilayer membrane further comprises a cohesively breakable peeling layer comprising polypropylene, polyethylene and talc and an innermost sealing layer comprising a random copolymer grafted with maleic anhydride, the tie layer is located between the backbone layer and the intermediate layer, and the tie layer is located between the intermediate layer and the cohesively breakable peeling layer.

2. The composite film according to claim 1, wherein the random copolymer grafted with maleic anhydride of the innermost sealing layer comprises monomers of propylene, ethylene and butylene, and wherein the ethylene and butylene content together is less than 10 percent weight of the copolymer.

3. The composite film according to claim 1, wherein the content of talc in the cohesively breakable peeling layer is between 5 and 49 weight percent.

4. The composite film according to claim 1, wherein the hygroscopic polyamide is a partially crystalline polyamide.

5. The composite film according to claim 4, wherein the partially crystalline polyamide is a polyamide 6.6 or polyamide 66,6.

6. The composite film accordingly to claim 1, wherein the maleic anhydride grafted polypropylene of each of the tie layers is a homopolymeric polypropylene.

7. The composite film according to claim 1, wherein the intermediate tie layer comprises a maleic anhydride grafted polypropylene.

8. The composite film according to claim 1, wherein the intermediate tie layer comprises an adhesive.

9. The composite film according to claim 1, wherein the metal film of the outer support layer is an aluminum film having a thickness of 20 to 160 micron.

10. The composite film according to claim 1, wherein the thickness of the backbone layer is from 8 to 12 micron.

11. The composite film according to claim 1, wherein the thickness of the intermediate layer is from 8 to 12 micron.

12. The composite film according to claim 1, wherein the thickness of each tie layer is from 3.5 to 4.5 micron.

13. A composite film for closing a container by sealing the composite film against a sealing surface of the container or of a cap ring to be connected to the container, the composite film comprising:
   an outer support layer comprising a metal film,
   an inner multilayer membrane, and
   an intermediate tie layer bonding the outer support layer to the inner multilayer membrane,
   characterized in that the inner multilayer membrane comprises:
   a backbone layer comprising polypropylene,
   an intermediate layer comprising partially crystalline polyamide,
   a cohesively breakable peeling layer comprising polypropylene, polyethylene and talc,
   an innermost sealing layer comprising a random copolymer grafted with maleic anhydride,
   a tie layer comprising a maleic anhydride grafted polypropylene, the tie layer located between the backbone layer and the intermediate layer, and
   a tie layer comprising a maleic anhydride grafted polypropylene, the tie layer located between the intermediate layer and the cohesively breakable peeling layer.

14. The composite film according to claim 13, wherein the partially crystalline polyamide is polyamide 6,6 or polyamide 66,6.

15. The composite film according to claim 1, wherein the maleic anhydride grafted polypropylene of each of the tie layers is a homopolymeric polypropylene.

16. The composite film according to claim 1, wherein the metal film is an aluminum film having a thickness of 20 to 160 micron.

* * * * *

UNITED STATES PATENT AND TRADEMARK OFFICE
CERTIFICATE OF CORRECTION

| | |
|---|---|
| PATENT NO. | : 11,498,316 B2 |
| APPLICATION NO. | : 16/758698 |
| DATED | : November 15, 2022 |
| INVENTOR(S) | : Christoph Dietrich, Steven Welvaert and Bert De Schoenmaker |

It is certified that error appears in the above-identified patent and that said Letters Patent is hereby corrected as shown below:

In the Specification

Column 4, Line 30, Delete "21" and insert -- 20 --, therefor.

Signed and Sealed this
Fifth Day of December, 2023

Katherine Kelly Vidal
*Director of the United States Patent and Trademark Office*